United States Patent [19]

Morimoto

[11] Patent Number: 5,084,616
[45] Date of Patent: Jan. 28, 1992

[54] SCANNER HAVING HORIZONTAL SYNCHRONIZING SIGNAL GENERATOR WITH PRISM LIGHT DIAMETER REDUCING MEANS

[75] Inventor: Akira Morimoto, Tokyo, Japan

[73] Assignee: Asahi Kogaku Kogyo Kabushiki Kaisha, Tokyo, Japan

[21] Appl. No.: 493,416

[22] Filed: Mar. 14, 1990

[30] Foreign Application Priority Data

Mar. 16, 1989 [JP] Japan .................................. 1-64874

[51] Int. Cl.[5] .......................................... H01J 5/16
[52] U.S. Cl. ..................................... 250/235; 359/669
[58] Field of Search ............... 250/235, 236; 350/6.8, 350/6.7, 6.4, 421

[56] References Cited

U.S. PATENT DOCUMENTS

| | | | |
|---|---|---|---|
| 4,623,225 | 11/1986 | Forkner | 350/421 |
| 4,627,690 | 12/1986 | Fantone | 350/421 |
| 4,776,654 | 10/1988 | Ishizuka et al. | 350/6.8 |
| 4,823,002 | 4/1989 | Saito | 250/236 |
| 4,828,371 | 5/1989 | McCaslin et al. | 350/421 |
| 4,846,550 | 7/1989 | Schuma et al. | 359/669 |
| 4,850,686 | 7/1989 | Morimoto et al. | 350/484 |
| 4,948,233 | 8/1990 | Maruyama | 350/421 |

FOREIGN PATENT DOCUMENTS 62-75612  4/1987  Japan .
63-98624  4/1988  Japan .
63-173010  7/1988  Japan .

OTHER PUBLICATIONS

English Abstracts of Japenese Publication Nos. 62-57612, 63-98624 & 63-173010.

Primary Examiner—David C. Nelms
Assistant Examiner—Que T. Le
Attorney, Agent, or Firm—Sandler, Greenblum & Bernstein

[57] ABSTRACT

A horizontal synchronizing signal detecting optical system of an optical scanning apparatus includes a light receiving element for receiving light flux deflected by a deflector and converged by a scanning lens outside an effective scanning range. A prism optical system for reducing the diameter of the light flux which is received by the light receiving element at least within a principal scanning direction is provided.

15 Claims, 6 Drawing Sheets

FIG. 3A
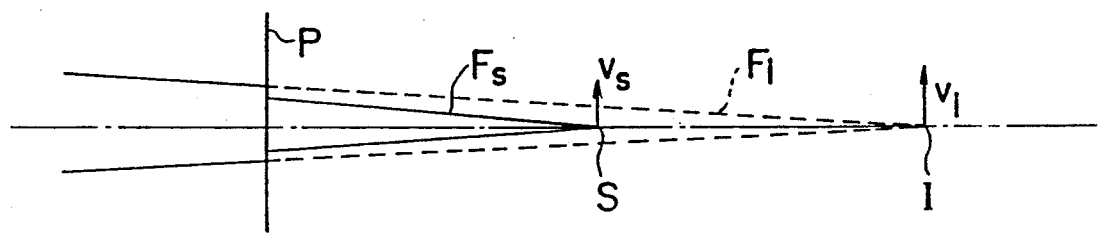
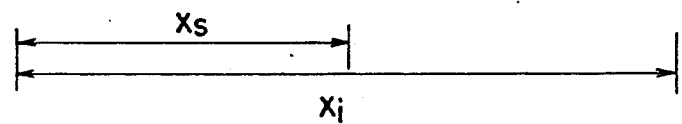
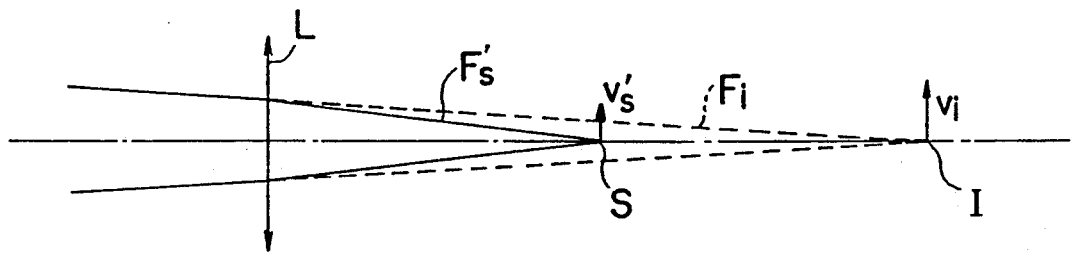
FIG. 3B

SCANNER HAVING HORIZONTAL SYNCHRONIZING SIGNAL GENERATOR WITH PRISM LIGHT DIAMETER REDUCING MEANS

BACKGROUND OF THE INVENTION

1. Field of the Invention

This invention relates to an optical system for detecting a horizontal synchronizing signal for determining the start timing of a laser output for printing, drawing, etc. in an optical scanning apparatus of a laser printer, etc.

2. Description of the Prior Art

An optical scanning apparatus of a laser printer, etc. has a light receiving element for receiving light outside an effective scanning range for using a light flux from a scanning lens for drawing in order to obtain a good timing of a starting point for drawing, and a horizontal synchronizing signal a so-called BD pulse, is output from this light receiving element.

FIG. 9 shows an optical system of a conventional optical scanning apparatus. A light flux coming from a light source (not shown) is reflected and deflected by a polygon mirror 1 and focused onto an objective surface to be scanned (not shown) through an fθ lens 2. A mirror 3 is disposed outside the effective scanning range and adapted to reflect the light flux from the fθ lens toward a light receiving element 4 which is adapted to detect a horizontal synchronizing signal.

In order to make the rising of the output sharp, the light receiving element 4 is disposed in the vicinity of a position where the light flux is most converged, that is, in the vicinity of a position equivalent to an image surface.

However, with the construction of FIG. 9, the optical path from the fθ lens 2 to the light receiving element 4 is too long and the optical system can not be made compact. Therefore, various proposals have heretofore been made in order to shorten the optical path and make the optical apparatus compact.

However, by merely placing the light receiving element nearer to the fθ lens it is impossible to achieve the intended result because the diameter of the light flux, which is made incident to the light receiving element, becomes large and the bottom portion of the distribution of light quantity spreads out which eventually makes the rising of the output dull (i.e., not sharp). In order to prevent this, it is necessary to keep the construction such that the light receiving element is disposed where the light flux is most converged.

Japanese Patent Early Laid-open Publication Nos. Sho 62-75612, 63-98624 and 63-173010 disclose providing a convex lens and a concave mirror in an optical path between a scanning lens and a light receiving element in order to shorten the length of the optical path.

However, the employment of the convex lens and the concave mirror in order to achieve the object of making the apparatus compact gives rise to the following problems.

First, as the power of the fθ lens is added to the power of the convex lens, etc., and angle of convergence of the light flux becomes large (i.e., F number becomes small) when compared with a case where the convex lens, etc. is not utilized. Therefore, even a slight displacement of the light receiving element makes the diameter of the light flux large, and the rising of the output becomes dull. In order to prevent this, the accuracy required for mounting the light receiving element becomes critical.

Second, due to the power of the convex lens, etc., scanning speed of the light flux becomes slow and the rising of the output of the light receiving element becomes dull.

In case where the output is dull, an accuracy of determining the start point of the drawing gets worse.

SUMMARY OF THE INVENTION

A horizontal synchronizing signal detecting optical system according to the present invention is characterized by a prism optical system that is adapted to reduce the diameter of a light flux at least within a principal scanning plane scanned by the light flux and is disposed between a scanning lens and a light receiving element.

BRIEF DESCRIPTION OF THE DRAWINGS

FIG. 3 is an illustration of the principle of convergence of the light flux, FIG. 3(A) shows a case where a prism is employed and FIG. 3(B) shows a case where a lens is employed.

DETAILED DESCRIPTION OF THE EMBODIMENTS

First, the principle of the present invention will be explained by comparison with a conventional system using a convex lens and with reference to the drawings.

Figure 2:
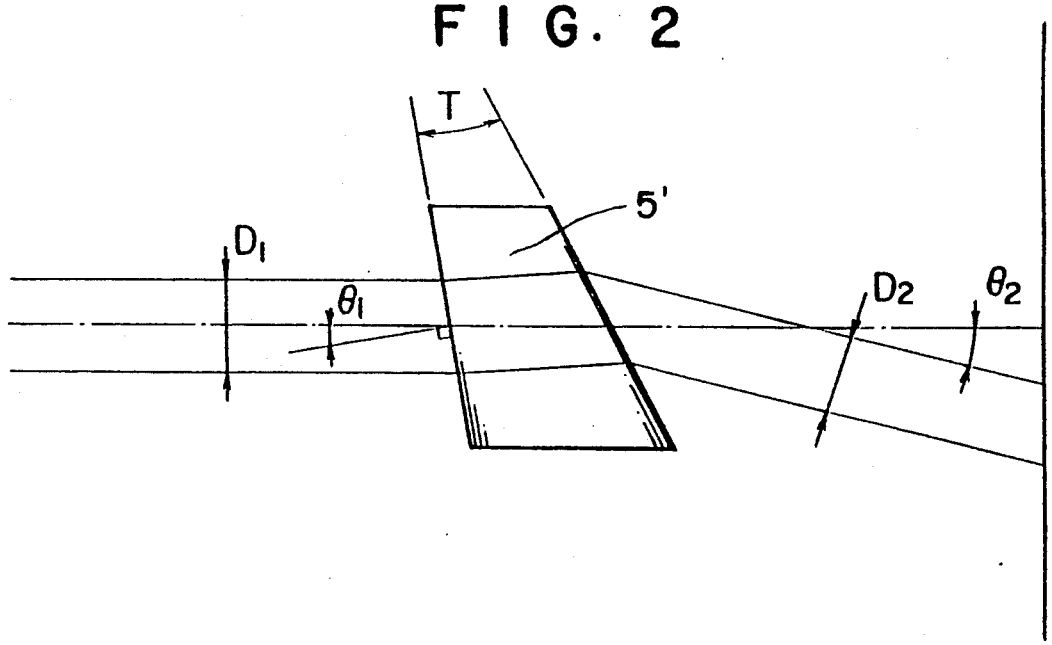
FIG. 2 is an illustration of the change of light flux caused by a prism.

FIG. 2 shows a state where a light flux having a diameter $D_1$ is made incident to a prism 5' having a vertex T, at angle $\theta_1$ with respect to a normal line of an incident surface thereof.

If an angle formed by a light flux before being made incident to the prism and after being made incident to the prism is represented by $\theta_2$, and the diameter of an outgoing light flux is represented by $D_2$, the following relations can be obtained;

$$\theta_2 = \theta_1 T - \sin^{-1}\{n \cdot \sin(\theta_1 + T - \alpha)\}$$

$$\alpha = \theta_1 - \sin^{-1}(\sin \theta_1 / n)$$

$$D_2/D_1 = \{\cos(\theta_1 - \alpha)/\cos \theta_1\} \cdot \{\cos(\theta_2 - \theta_1 - T)/\cos(\theta_1 + T - \alpha)\}$$

As the prism is an afocal optical system having no refracting power, an angular magnification $\beta$ can be expressed as follows;

$$\beta = D_1/D_2$$

As the prism has the angular magnification $\beta$, not only the outgoing diameter but also the degree of convergence is changed when the converged light is made incident onto the prism.

Therefore, in spite of the fact that the prism does not have power like a lens, it can substantially change the position of the point of convergence.

In FIG. 3, a distance to the convergence point I is represented by Xi when a convergence element such as prism, lens, etc. is not provided, and a distance to the convergence point S is represented by Xs when such convergence element is provided.

As is shown in FIG. 3(A), when a prism P (which is schematically shown by a thin system in the drawing) is provided as a convergence element, if the angular magnification of the prism is represented by m (m>1), the following relation can be obtained;

$$Xs = Xi/m^2$$

In order to make the convergence point be located at S using the lens L (which is schematically shown by a thin system in the drawing), a focal length f of the lens, as shown in FIG. 3(B), becomes as follows;

$$f = (Xi \cdot Xs)/(Xi - Xs)$$

If the F number of the light flux directing toward the convergence point I is represented by Fi, the F number Fs' of the light flux directing toward the convergence point S when the lens L is used, becomes;

$$Fs' = (Xs/Xi) \cdot Fi$$

On the other hand, when a prism P is used (A), the diameter of the light flux becomes small. Therefore, the convergence angle of the light flux becomes small compared with a case where a lens is used and the F number Fs of the light flux directing toward the convergence point S can be expressed as follows;

$$Fs = \sqrt{(Xs/Xi)} \cdot Fi$$

Since Xs/Xi<1 here, Fs>Fs'. Therefore, the system using a prism can have a larger F number of the light flux. In other words, a convergence angle of the light flux can be made small.

By the way, if the wavelength is represented by $\lambda$ and the F number by F, a focal depth d can be found from the following relation;

$$d = K(\lambda \cdot F^2)$$

(K: constant)

Thus, the larger the F number is, the deeper the focal depth becomes. The term "focal depth," when used here, refers to a range in the optical axis direction about a position where the light flux is converged most and to a small range of the diameter of the light flux just enough to ensure a sharp rising of a signal which is output from the light receiving element. The smaller the convergence angle of the light flux is, that is, the larger the F number of the light flux is, the larger this range becomes.

Therefore, by using a prism optical system, the focal depth can be made considerably deeper when compared with a case where a lens is used, and the position accuracy in the optical axis direction of the light receiving element can be eased.

Also, if the scanning speed of a spot at the converged point I is represented by Vi when the lens L is not provided, the scanning speed Vs' when the lens L is provided can be expressed as follows;

$$Vs' = (Xs/Xi) \cdot Vi$$

while the scanning speed Vs when the prism P is provided becomes as follows;

$$Vs = \sqrt{(Xs/Xi)} \cdot Vi$$

Since Xs/Xi<1 as already mentioned, Vs>Vs'. Thus, by using the prism P, the speed of the spot crossing the light receiving element can be increased when compared with the case where the lens L is used. Therefore, the rising of a horizontal synchronizing signal detected from the light receiving element becomes sharp and the synchronous signal can be stabilized.

Also, when reduction ratio becomes large, the diameter of the outgoing light flux from the prism optical system is so small. Therefor, since a concave lens is inserted between the scanning lens and light receiving means or a prism surface is formed into a concave surface, the light receiving element can receive the light flux as small diameter in any position on the optical path.

FIRST EMBODIMENT

Figure 1:
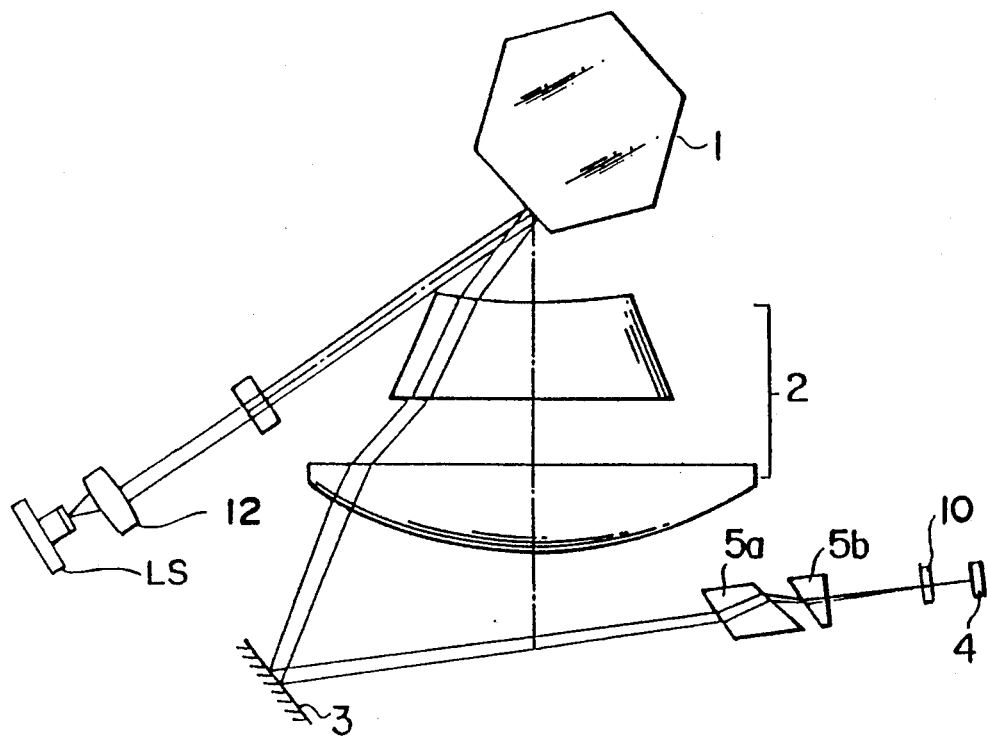
FIG. 1 is an illustration of a first embodiment of a horizontal synchronizing signal detecting optical system of an optical scanning apparatus according to the present invention.

FIG. 1 shows the first embodiment of a horizontal synchronizing signal detecting optical system of an optical scanning apparatus according to the present invention.

This apparatus reflects and deflect light flux emitted from a light source LS through a collimator lens 12 by the polygon mirror 1, and forms an image on an objective surface to be scanned (not shown) through an f$\theta$ lens 2, thereby to form a pattern on the surface to be scanned.

In this specification, the plane in which scanning is performed on the surface to be scanned is referred to as the principal scanning plane, and the plane normal the principal scanning plane is referred to as the auxiliary scanning plane.

The horizontal synchronizing signal detecting optical system comprises a mirror 3 disposed outside an effective scanning area, a light receiving element 4 adapted to receive the light flux reflected by the mirror 3, and prisms 5a, 5b disposed in the optical path between the mirror 3 and the light receiving element 4 and adapted to move the point of converging of the light flux toward the f$\theta$ lens within the principal scanning plane.

In case the prism optical system is provided in order to move the converging point close, if the construction merely uses a wedge type prism, the optical path is bent. Therefore, in this example, two prisms 5a, 5b are provided in order to move the point of convergence without bending the optical path.

Figure 4:
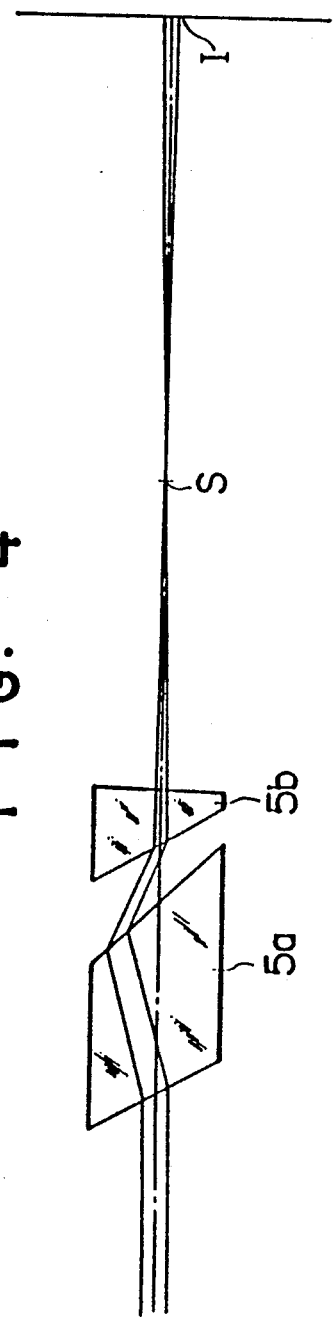
FIG. 4 is a principal scanning sectional view of the prism optical system portion of FIG. 1.
Figure 5:
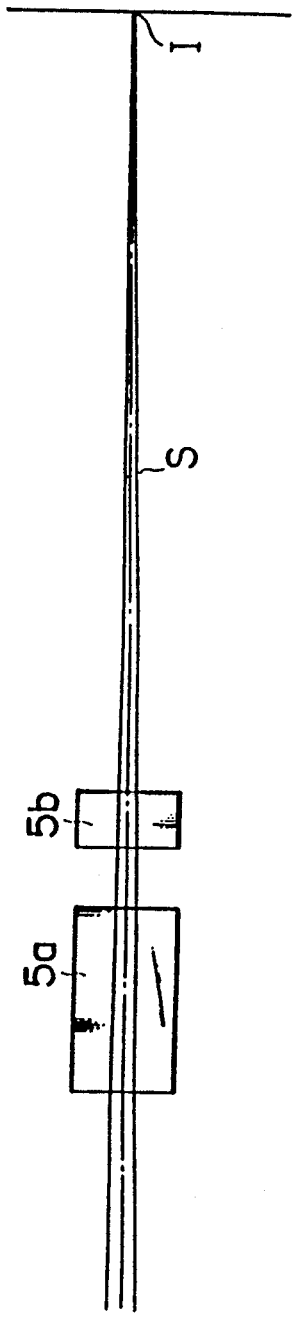
FIG. 5 is an auxiliary scanning sectional view of the prism optical system portion of FIG. 1.

FIGS. 4 and 5 are enlarged views of the prism optical system of FIG. 1, FIG. 4 is an illustration of the same principal scanning plane as that of FIG. 1, and FIG. 5 is an illustration of a auxiliary scanning plane.

In the drawings, the I point shows the point of convergence when the prism optical system is not provided, while the S point shows the point of convergence when the prism optical system is provided. The prism optical system has an angular magnification only within the principal scanning plane and merely acts as a parallel plane within the auxiliary scanning plane.

Concrete numerical construction of the prisms 5a, 5b is shown in TABLE 1. The surface number is assigned from the incident side of the light flux, in order. The reference character $\theta$ denotes the angle of the surface (angle with respect to the plane having an optical axis as a normal line), d a distance between two surfaces along the optical axis, and n is the refractive index. The angle is set such that the counterclockwise direction is positive in the drawing.

TABLE 1

| Surface No. | $\theta$ | d | n |
|---|---|---|---|
| 1 | 30° | 12.5 | 1.78565 |
| 2 | 44.5° | 3.8 | |
| 3 | 31.52° | 3.5 | 1.51072 |
| 4 | −1.15° | | |

Distance from the fourth surface to the point I: 50.0
Magnification: 1/1.35
Distance from the fourth surface to the point S: 20.1

SECOND EMBODIMENT

Figure 6:
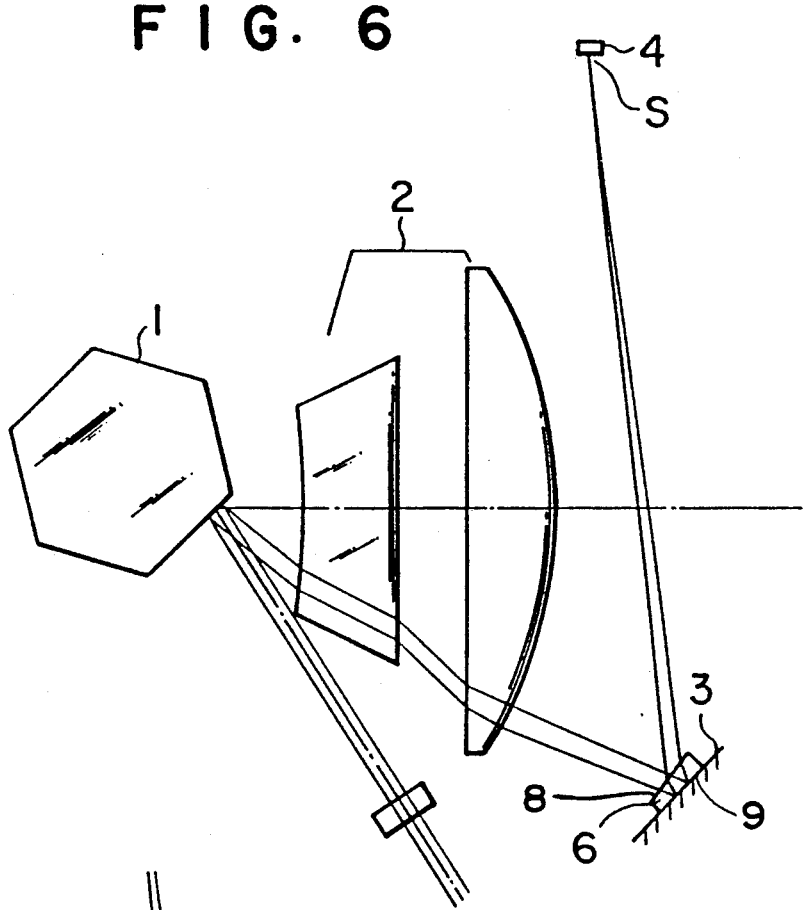
FIG. 6 is an illustration of a second embodiment of a horizontal synchronizing signal detecting optical system according to the present invention.
Figure 7:
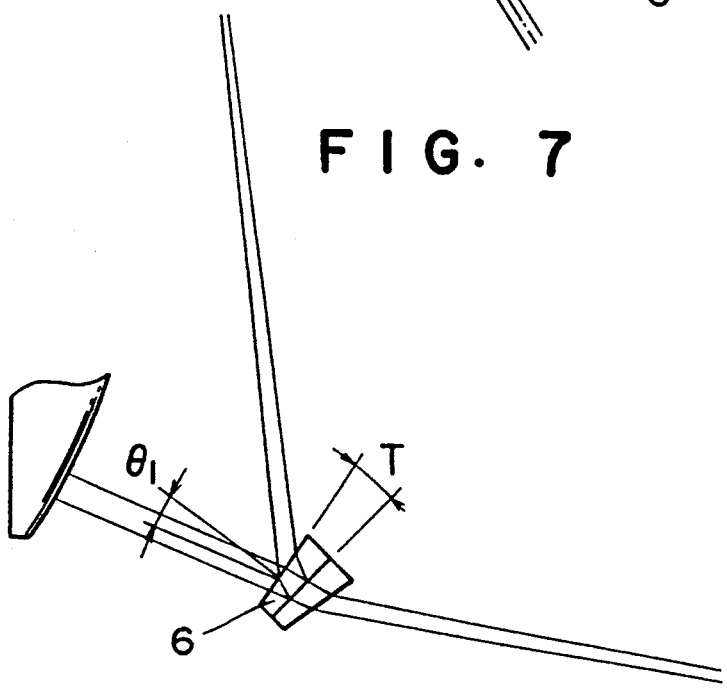
FIG. 7 is a development of an optical path of the prism portion of FIG. 6.

FIGS. 6 and 7 show the second embodiment of the present invention.

In this embodiment, a prism 6 having a vertex T is disposed at a portion where the light flux is reflected toward a light receiving element 4 for the use of horizontal synchronizing signal detection, and the light flux is reciprocally transmitted within the prism. A first surface 8 of the prism 6 is a refractive surface for the light flux to be incident and outgoing, while a second surface thereof 9 is a reflecting surface coincident with the mirror 3. Concrete numerical construction of the prism 6 is as follows;

$\theta = -13.9°$ $n = 1.51072$ $T = -10°$

Distance from the outgoing surface of prism 6 to the point I: 188.2.
Magnification: 1/1.27.
Distance from the outgoing surface of prism 6 to the point S: 118.8.

FIG. 7 is an development of the above-mentioned optical system along the optical path.

The light receiving element 4 is preferably disposed such that an incident surface thereof will not be normal to a principal ray of the incident light flux so that return of ghost light toward the scanning lens side caused by reflection from the incident surface can be prevented. Also, by virtue of the foregoing arrangement, the scanning speed of a spot crossing the light receiving element is substantially increased and the rising of the synchronous signal can be sharpened.

Particularly, according to the present invention, as the focal depth of the detecting light flux is deep, adverse effects due to out of focus condition is minor, even when the incident surface is inclined.

In the above-mentioned two embodiments, as the convergence caused by the prism optical system acts only in the principal scanning direction, the spot becomes a long linear line in the auxiliary scanning direction on the light receiving element. Therefore, even when the light receiving element is displaced in the auxiliary scanning direction with respect to the spot, a horizontal synchronizing signal can be obtained.

However, in case the intensity of the laser beam reaching the light receiving element is weak, if a cylindrical lens 10 (FIG. 1) having a power only in the auxiliary scanning direction, is disposed near the light receiving element, energy can be concentrated. The cylindrical lens also functions to correct a position displacement in the auxiliary scanning direction of the spot.

Furthermore, besides the above-mentioned arrangement where the cylindrical lens is independently provided, the same effect can also be obtained by forming the surface of the prism into a cylindrical configuration.

THIRD EMBODIMENT

Figure 8:
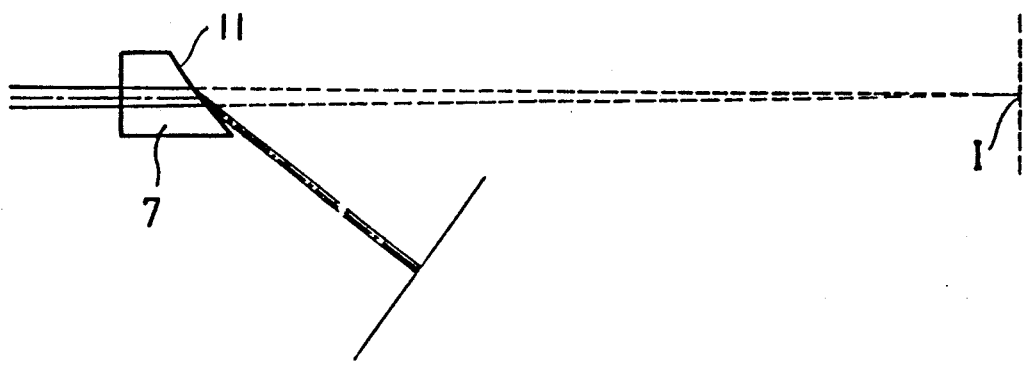
FIG. 8 is an illustration of a third embodiment of a horizontal synchronizing signal detecting optical system according to the present invention.
Figure 9:
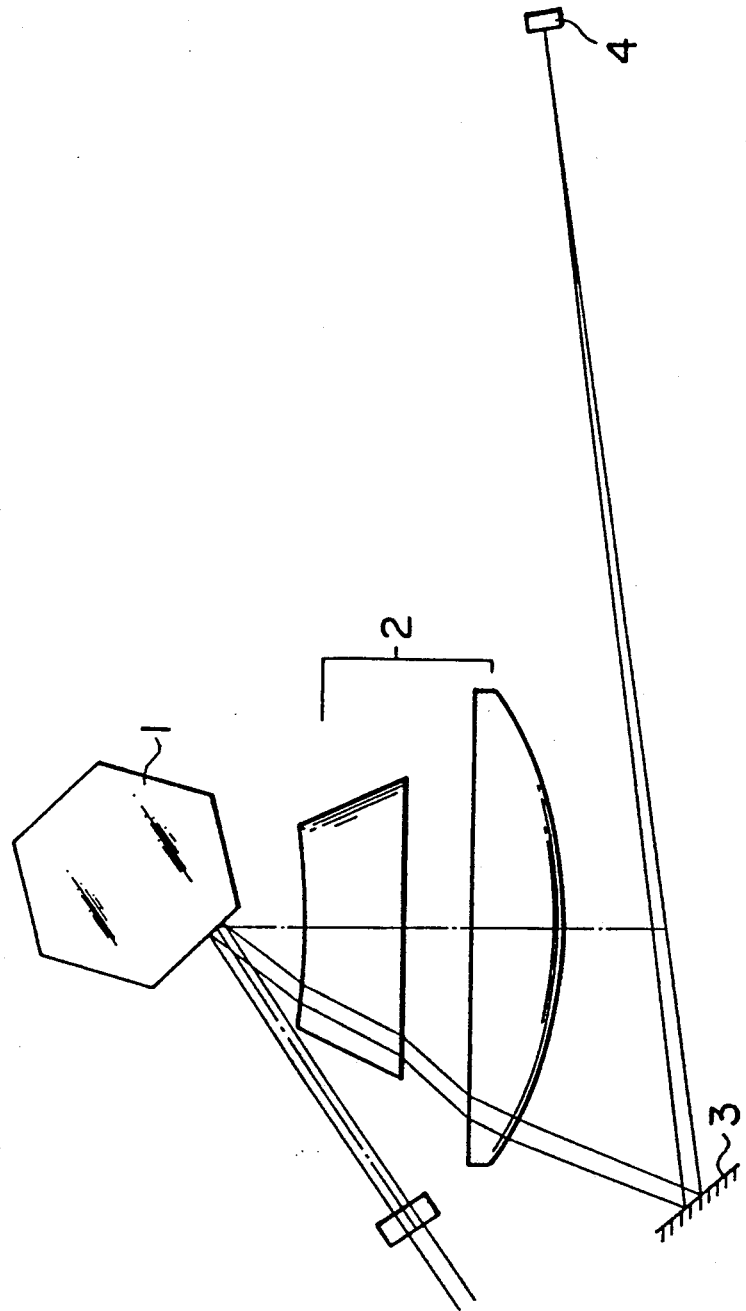
FIG. 9 is an illustration of an optical system of the conventional optical scanning apparatus.

FIG. 8 shows third embodiment according to the present invention. In this embodiment, only the area about the prism portion is described. Other construction details are same as in the first embodiment.

A prism 7 is formed from a single prism having 1/3.2 in magnification, the outgoing surface is formed as negative cylinder surface 11. Concrete numerical construction of the prism 7 is as follows;

$\theta_1 = 0°$ $d = 5.00$ $n = 1.51072$ $\theta_2 = 40°$ $r = 80.9$ wherein the reference character r denotes the radius of curvature of the outgoing surface of the prism.

Distance from the outgoing surface of prism 7 to the point I: 50.0.
Magnification: 1/3.21.
Angle of deviation: 36.2°.

According to above-mentioned construction, a convergent incident light flux is converted to a parallel outgoing light flux, and diameter of the outgoing light flux is 1/3.4 times of the same of the incident light flux.

For example, in case where a light flux having 100 in F number is incident, the outgoing light flux from the prism 7 is a parallel light flux having 160 μm width in the principal scanning plane, and the light flux has a small enough diameter to detect the horizontal synchronizing signal.

Therefor, even if the distance between the prism 7 and the light receiving element 4 is changed, the diameter of the outgoing light flux form the prism 7 is not changed, in theory. In point of fact, as diffraction occurs, there is a limitation in the range in which the light flux is deemed a parallel flux. However a degree of freedom available for locating the light receiving element is higher than in the first and second embodiment.

As described in the foregoing, according to the present invention, the point of convergence within the principal scanning plane of the light flux for the use of horizontal synchronizing signal detection can be closer to the light source side, and the apparatus can be made compact as a whole.

Also, as the F number of the light flux can be made large, when compared with a case where a convergent optical element such as a convex lens, etc. is used in order to make the focal point approach the light source, the focal depth can be made deep and the scanning speed of the spot crossing the light receiving element can be increased.

Therefore, as an allowable range is broad with respect to mounting errors of the light receiving element, even if the light receiving element is disposed in a position somewhat displaced from the focal point, there arises no practical problem and parts can be interchangeably used between different scanning units.

Also, as the rising of the output of the light receiving element can be sharpened because of a relatively small drop in the scanning speed, the horizontal synchronizing signal can be stabilized and the timing for starting the drawing can be correctly determined.

Further, when the prism optical system is formed such that the outgoing light flux is a parallel flux, the distance between the prism and the light receiving element can be set free.

In the above-mentioned embodiments, the light receiving element is disposed in the principal scanning plane. However, the scope of the invention is not limited to this construction. For example, in the first embodiment, the light receiving element 4 can be positioned either in or out of the principal scanning plane by changing the angle of the mirror 3.

What is claimed is:

1. A horizontal synchronizing signal detecting optical system of an optical scanning apparatus including;
   a light receiving element for receiving a light flux deflected by a deflector and converged by a scanning lens outside an effective scanning range; and
   a prism optical system for reducing the diameter of the light flux which is received by said light receiving element, at least a principal scanning direction.

2. A horizontal synchronizing signal detecting optical system of an optical scanning apparatus as claimed in claim 1, wherein said prism optical system is composed of a combination of a plurality of prism elements so that an angle of incident light is coincident with that of outgoing light.

3. A horizontal synchronizing signal detecting optical system of an optical scanning apparatus as claimed in claim 1, wherein a mirror is disposed between said scanning lens and said light receiving element.

4. A horizontal synchronizing signal detecting optical system of an optical scanning apparatus as claimed in claim 1, wherein said prism optical system is composed of a single prism element having a refractive surface for the light flux to pass into and out of and a reflecting surface for reflecting the light flux at the back of said prism.

5. A horizontal synchronizing signal detecting optical system of an optical scanning apparatus as claimed in claim 1, which further includes a cylindrical lens for converging the light flux which is received by said light receiving element in a auxiliary scanning direction.

6. A horizontal synchronizing signal detecting optical system of an optical scanning apparatus as claimed in claim 1, wherein said light receiving element is inclined with respect to a principal ray of said incident light flux.

7. A horizontal synchronizing signal detecting optical system of an optical scanning apparatus as claimed in claim 1, wherein said prism optical system converts a convergent incident light flux to a parallel outgoing light flux.

8. A horizontal synchronizing signal detecting optical system of an optical scanning apparatus including:
   a light receiving element for receiving a light flux deflected by a deflector and converged by a scanning lens outside an effective scanning range; and
   a prism optical system composed of a combination of a plurality of prism elements so that angle of an incident light is coincident with that of outgoing light, and adapted to reduce the diameter of the light flux which is received by said light receiving element at least a principal scanning direction.

9. A horizontal synchronizing signal detecting optical system of an optical scanning apparatus as claimed in claim 8, wherein a mirror is disposed between said scanning lens and said light receiving element.

10. A horizontal synchronizing signal detecting optical system of an optical scanning apparatus as claimed in claim 8, which further includes a cylindrical lens converging the light flux which is received by said light receiving element in a auxiliary scanning direction.

11. A horizontal synchronizing signal detecting optical system of an optical scanning apparatus including:
    a light receiving element for receiving a light flux deflected by a deflector and converged by a scanning lens outside an effective scanning range; and
    a prism optical system composed of a single prism element having a refractive surface for the light flux to pass into and out of and a reflecting surface for reflecting the light flux at the back of said prism, and adapted to reduce the diameter of the light flux which is received by said light receiving element, at least in a principal scanning direction.

12. A horizontal synchronizing signal detecting optical system of an optical scanning apparatus as claimed in claim 11, which further includes a cylindrical lens converging the light flux which is received by said light receiving element in a auxiliary scanning direction.

13. An optical scanning apparatus including:
    a light source for emitting a light flux;
    a deflector for deflecting the light flux emitted from said light source;
    a scanning lens for imaging the deflected light flux on an objective surface to be scanned;
    a light receiving element for receiving light flux from said scanning lens outside an effective scanning range; and
    a prism optical system disposed between said scanning lens and said light receiving element and adapted to reduce the diameter of the light flux which is received by said light receiving element, at least in a principal scanning direction,
    said prism optical system being composed of a combination of a plurality of prism elements so that the angle of incident light is coincident with the angle of outgoing light.

14. An optical scanning apparatus as claimed in claim 13, wherein a mirror is disposed between said scanning lens and said light receiving element.

15. An optical scanning apparatus as claimed in claim 13, which further includes a cylindrical lens converging the light flux which is received by said light receiving element in a auxiliary scanning direction.

* * * * *

UNITED STATES PATENT AND TRADEMARK OFFICE
CERTIFICATE OF CORRECTION

PATENT NO. : 5,084,616
DATED : January 28, 1992
INVENTOR(S) : Akira Morimoto

It is certified that error appears in the above-indentified patent and that said Letters Patent is hereby corrected as shown below:

Title page, item [54] and col. 1, line 1-4, the title should read--HORIZONTAL SYNCHRONIZING SIGNAL DETECTING OPTICAL SYSTEM FOR OPTICAL SCANNING APPARATUS--.

At column 7, line 41 (claim 1, line 8), after "least" insert ---in---.

At column 7, line 63 (claim 5, line 4), change "a" to ---an---.

At column 8, line 16 (claim 8, line 11), after "least" insert ---in---.

At column 8, line 25 (claim 10, line 5), change "in" to ---on---.

At column 8, line 42 (claim 12, line 5), change "a" to ---an---.

At column 8, line 67 (claim 15, line 4), change "a" to ---an---.

Signed and Sealed this

Twenty-fourth Day of September, 1996

Attest:

BRUCE LEHMAN

*Attesting Officer*     *Commissioner of Patents and Trademarks*